United States Patent
Vanco et al.

(10) Patent No.: US 9,811,539 B2
(45) Date of Patent: Nov. 7, 2017

(54) HIERARCHICAL SPATIAL CLUSTERING OF PHOTOGRAPHS

(71) Applicant: Google Inc., Mountain View, CA (US)

(72) Inventors: Marek Vanco, Sunnyvale, CA (US); Wei Luo, Saratoga, CA (US)

(73) Assignee: Google Inc., Mountain View, CA (US)

( * ) Notice: Subject to any disclaimer, the term of this patent is extended or adjusted under 35 U.S.C. 154(b) by 615 days.

(21) Appl. No.: 13/871,920

(22) Filed: Apr. 26, 2013

(65) Prior Publication Data

US 2015/0154228 A1 Jun. 4, 2015

Related U.S. Application Data

(60) Provisional application No. 61/639,060, filed on Apr. 26, 2012.

(51) Int. Cl.
*G06F 17/30* (2006.01)

(52) U.S. Cl.
CPC .................. *G06F 17/30274* (2013.01)

(58) Field of Classification Search
CPC ......... G06F 17/30047; G06F 17/30244; G06F 17/30241
USPC .......... 707/E17.014, 769, 999.005, E17.001, 707/728, 999.003, E17.009, E17.018, 707/E17.026, E17.029, E17.031, E17.044, 707/E17.059, E17.108, E17.109, 723, 707/724, 737, 758, 772, 915, 999.004, 707/999.201; 715/753, 745, 789
See application file for complete search history.

(56) References Cited

U.S. PATENT DOCUMENTS

| | | | | |
|---|---|---|---|---|
| 7,663,671 | B2 * | 2/2010 | Gallagher | G06F 17/30265 348/231.2 |
| 7,725,837 | B2 * | 5/2010 | Wong | G06F 17/30274 715/720 |
| 7,860,866 | B2 * | 12/2010 | Kim | G06F 17/30041 707/737 |
| 2002/0004710 | A1 * | 1/2002 | Murao | G06T 17/005 702/167 |
| 2004/0267686 | A1 * | 12/2004 | Chayes | G06F 17/3071 |
| 2007/0139546 | A1 * | 6/2007 | Baiping | G06F 17/30265 348/333.01 |
| 2011/0097001 | A1 * | 4/2011 | Labbi | G06K 9/6253 382/225 |
| 2011/0265023 | A1 * | 10/2011 | Loomis | G06F 3/04812 715/771 |
| 2013/0173605 | A1 * | 7/2013 | Dou | G06F 17/30696 707/723 |

* cited by examiner

*Primary Examiner* — Jay Morrison
*Assistant Examiner* — Ken Hoang
(74) *Attorney, Agent, or Firm* — Lerner, David, Littenberg, Krumholz & Mentlik, LLP (57) ABSTRACT

A computer-implemented method of organizes photographs for display on an on-line map by selecting from a plurality of photographs a candidate set of photographs based on scores of the photographs, determining clusters from the selected photographs for display on the on-line map.

23 Claims, 5 Drawing Sheets

HIERARCHICAL SPATIAL CLUSTERING OF PHOTOGRAPHS

BACKGROUND

Field

The present disclosure is related to clustering of photos for display in an on-line mapping system.

Description of the Background Art

Some on-line mapping systems enable photographs to be displayed in conjunction with particular map features. For example photographs of buildings may be shown on a map proximate to the graphical representation of the building or its location. When systems allow users to contribute photographs to the body of photographs for display, the number of photographs of popular landmarks and other popular map features quickly becomes so large as to make it impractical to display all of the photographs on the on-line map. Traditional algorithms are not sufficient to provide an user-friendly selection of which photographs are to be displayed for the map of the area.

SUMMARY

An on-line mapping system displays photographs ("photos") related to map features in a hierarchy of maps at a plurality of zoom levels. For each of the zoom levels, a plurality of candidate photos are selected for clustering for the zoom level, based upon some objective criteria applied to the photos. Then, from the candidate photos for a given level, a plurality of clusters of photos are formed, with each cluster at a given level including a plurality of photos selected from the candidates. In one embodiment, a candidate photo is selected as a candidate photo based on a photo score associated with the photo. The determination of which photos to include in a cluster is based on the size of the resulting cluster and optionally, further selection based on the photo score. The photos selected as candidate photos at one zoom level are preferably used as candidate photos for the next zoom level down (i.e., more zoomed in level).

In one embodiment, the clusters at a given zoom level are determined by creating a minimum spanning tree of all candidate photos for that zoom level. The two photos with the shortest edge in the minimum spanning tree are the seed for the first cluster. Additional photos are added to the cluster provided that the cluster with the additional photos meets pre-determined criteria for the size and shape of the cluster. Once no more photos can be added, the next shortest edge in the spanning tree is used as the seed for the next cluster. This procedure is repeated until no more clusters can be formed.

Systems and non-transitory computer-readable storage media with executable programs stored thereon are provided that embody the disclosed methods.

The features and advantages described in this summary and the following detailed description are not all-inclusive. Many additional features and advantages will be apparent to one of ordinary skill in the art in view of the drawings, specification, and claims hereof.

DETAILED DESCRIPTION OF THE DRAWINGS

System Overview

Figure 1:
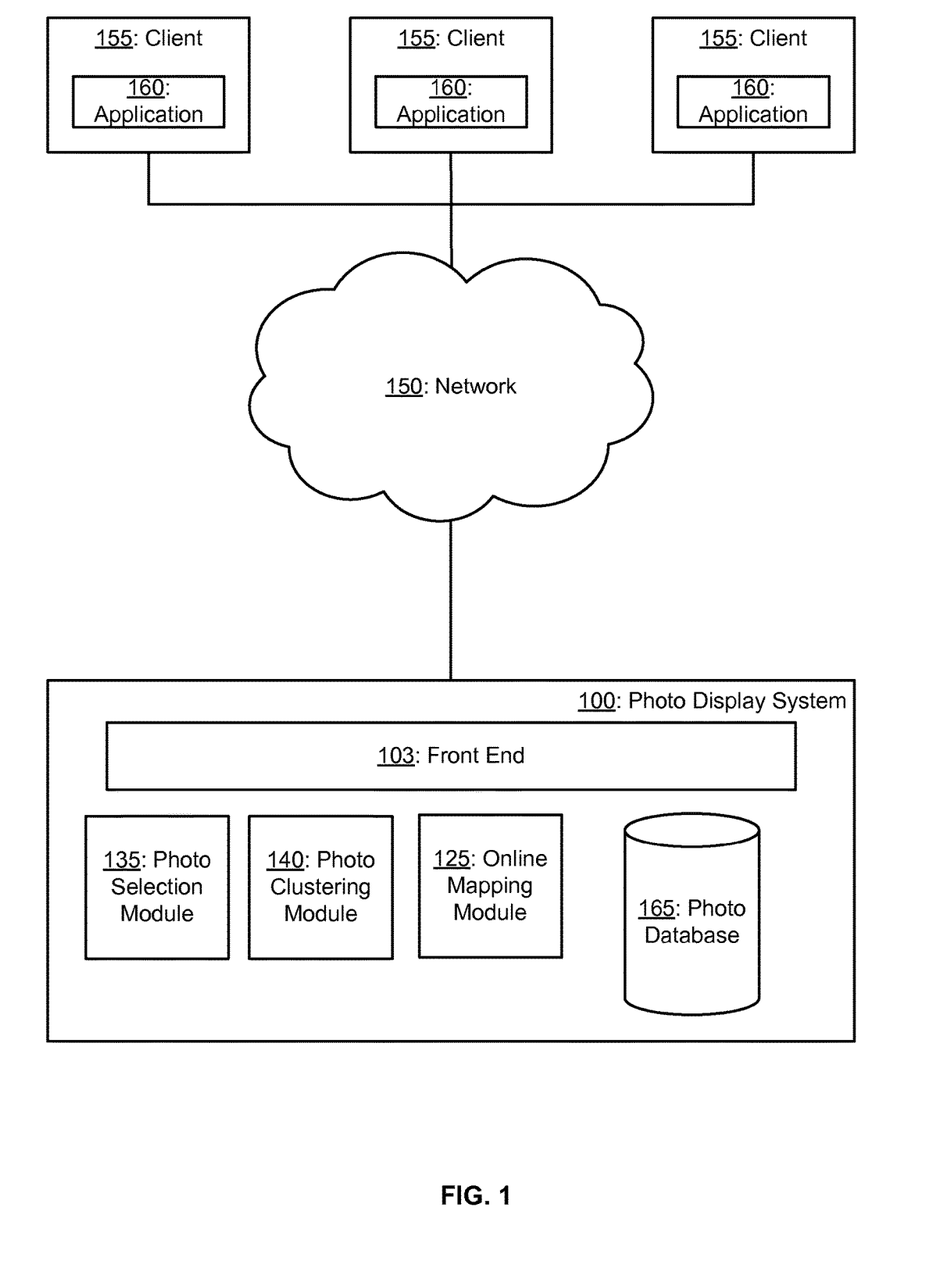
FIG. 1 is a diagram of system architecture according to one embodiment.

FIG. 1 is a diagram of system architecture according to one embodiment. The photo display system 100 comprises an online mapping module 125, a photo selection module 135, a photo clustering module 140 and a photo database 165. For simplicity, only one photo display system 100, online mapping module 125, photo selection module 135, photo clustering module 140 and photo database 165 are shown, but in practice many photo display systems 100, online mapping modules 125, photo selection modules 135, photo clustering modules 140 and photo databases 165 may be in operation.

The photo display system 100 communicates with one or more clients 155 via a network 150 and a front end 103. The network 150 is typically the Internet, but may also be any network, including but not limited to a LAN, a MAN, a WAN, a mobile, wired or wireless network, telecommunication network, a private network, or a virtual private network, and any combination thereof.

The photo display system 100 is implemented as a server program executing on one or more server-class computers comprising a CPU, memory, network interface, peripheral interfaces, and other well known components. The computers themselves preferably run an open-source operating system such as LINUX, have generally high performance CPUs, with 1 GB or more of memory, and 100 GB or more of disk storage. Of course, other types of computers can be used. The functionality implemented by any of the elements can be provided from computer program products that are stored in non-transitory tangible computer accessible storage mediums (e.g., RAM, hard disk, or optical/magnetic media), or by equivalent implementations in hardware and/or firmware.

The online mapping module 125 provides output devices such as clients 155 online maps and photos that are associated with points on the maps or satellite images, and is one means for performing this function. Online maps include traditional maps and also satellite images alone or with a map overlaid onto the satellite image. In some embodiments, the maps are displayed in pseudo-three dimensional renderings. In some embodiments, the on-line mapping system includes a 3D model of the Earth and satellite images are displayed on a projection of that model maintaining the curvature of the Earth. This is as opposed to projecting the image onto a flat surface. The online mapping module defines a plurality of zoom levels at which the maps may be displayed. A zoom level represents a level of scale, level of detail or magnification for the displayed part of the map. Zoom levels are arranged from low to high where a low zoom level (for example, level 0) is the most zoomed out and displays more surface area of the map at lower resolution (for example the entire United States). The highest zoom level is the most zoomed in and displays the smallest portion of the map and at high resolution (for example one city block).

The on-line map includes map features. A map feature is an entity that is associated with a geographic location (either a point or a region); the entity may be associated with the geographic location by being located there, either currently or at some time in the past. Examples of types of map features include, but are not limited to, points of interest (POI), natural features (e.g., bodies of water, mountains, forests, parks); cities, addresses, streets, businesses, train stations, bus stations, buildings, airports, historic sites, landmarks, monuments. A map feature is also stored in association with its geographic location, for example, its latitude and longitude, and optionally its street address.

The photo selection module 135 retrieves photos from the photo database 165 and selects a set of candidate photos to be used in determining clusters for each zoom level that is displayed by the online mapping module 125, and is one means for performing this function. Photos are photographs as well as any other digital image. The selection of candidate photos is described in greater detail in reference to FIG. 2.

The photo clustering module 140 uses the selected set of candidate photos for a given zoom level and determines one or more clusters using some or all of the set of candidate photos for display by the online mapping module 125 on the maps, and is one means for performing this function. In one embodiment the clustering maintains the spatial distribution and density of the photographs. The clustering of photos is described in greater detail in reference to FIG. 2.

The photo database 165 stores photos for display on on-line maps and satellite images. The photo database 165 is populated by users uploading photos related to map features; it may also include photographs from other sources, such as existing photo supply services, other websites, image databases (e.g., online image search systems) commercial or professional photo collections, and so forth. The photo database also stores attributes for the photos such as the location of the photo (e.g., latitude and longitude, geocode, or other location identification), a score for the photo and tags indicating whether the photo is selected as a candidate for clustering at a particular zoom level and then whether the photo is a member of a particular cluster of photos to be displayed by the online mapping module 125. Based on the photo's location, the photo database also stores an association for a photo with a map feature displayed on the on-line map. The photo's score is an indication of the photo's suitability for display. The photo's score may be determined as a function of the photo's assessed quality, popularity, number of user interactions with the photo, such as the number of times the photo has been viewed, clicked on, liked, and/or linked to by users, a ranking of the source of the photo, such as user uploading the photo or the website from which the photo was obtained, and/or rating of the photo by other users or moderators, such as to its quality or other aspects. Any way of scoring photographs may be used to determine the photo score.

The client 155 is any type of device that is adapted to access the photo display system 100 over the network 150. Examples of clients 155 include, but are not limited to, desktop computers as well as mobile devices such as a handheld computer, laptop computer, tablet computer, smart phone, mobile phone or personal digital assistant (PDA) and devices that receive map information which have been adapted to provide the structures and functions described herein. Most basically, a client 155 is configured with a client application 160 for displaying maps and photos received from the photo display system 100. For simplicity only three clients 155 are shown. In practice, very large numbers (e.g., millions) of clients 155, or as many as can be supported by the hardware and software implementation, can be in communication with the photo display system 100 at any time.

Process Overview

Figure 2:
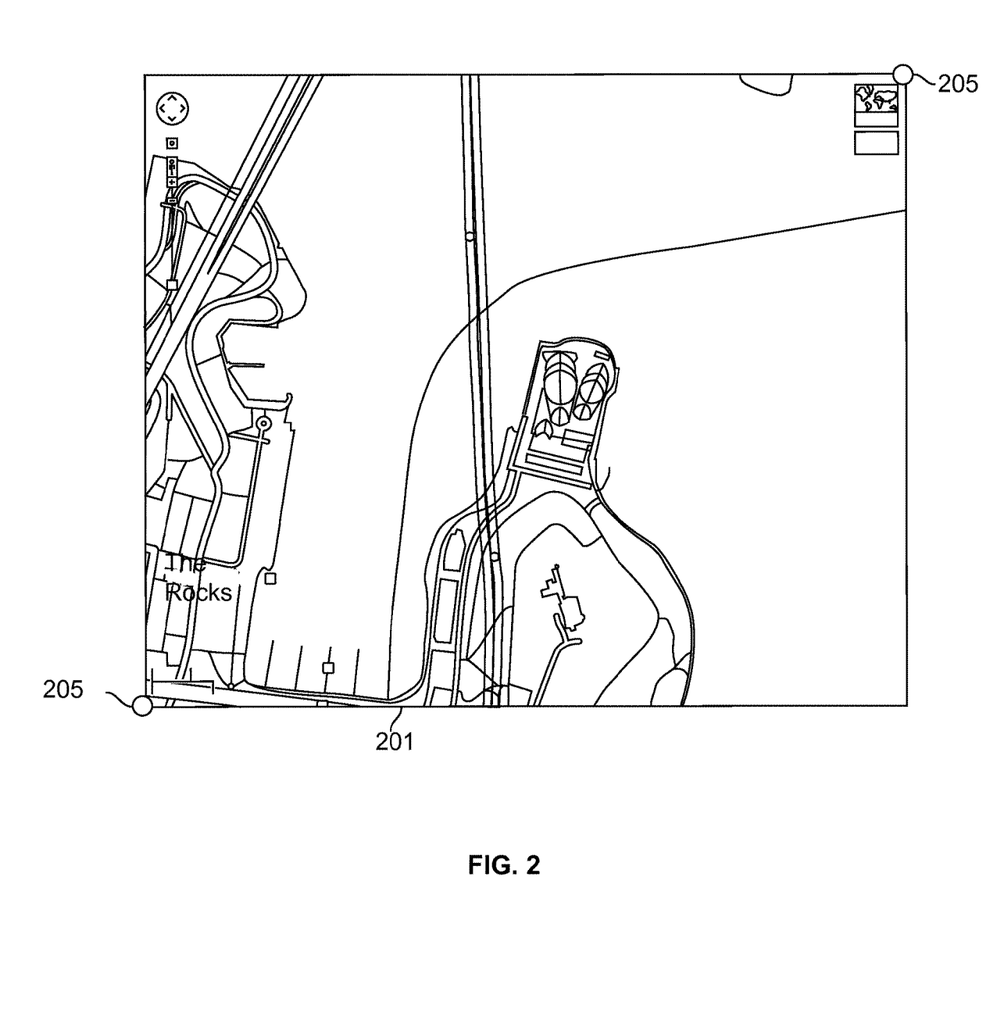
FIG. 2 is a screenshot illustrating a subregion for determining candidate photos according to one embodiment.

The process of selecting candidate photos and determining clusters from the candidate photos is described in reference to FIGS. 2-5. Photos are independently clustered for display for each zoom level at which the online mapping module 125 displays the online map. In the first step of the hierarchical clustering, photos to be considered for clustering (candidate photos) are selected for each zoom level starting at the lowest zoom level, 0 (most zoomed out level). The area available for display at each zoom level, which may be the whole earth depending on the online mapping module 125, is divided into subregions and candidate photos are selected for each subregion making up that zoom level. Each photo's location places it into a single subregion of each zoom level. FIG. 2 illustrates an example subregion 201. Each subregion can be identified by the latitude and longitude of opposite corners 205 of the subregion 201. Alternatively, the subregions can be identified by S numbering or Peano curve number.

The system selects not more than a threshold number of candidate photos, N, for each subregion. N is determined such that after clustering, the display of photos on the online map is aesthetically pleasing and the underlying online map is not overly obscured from view. The determination of N is thus based on the size of the icon representing each cluster and the size of the display area displayed to users. The determination of N is done empirically, testing various numbers of photos on the online map at a given zoom level and reviewing the resulting display for degree of crowding. In an example where there are 23 zoom levels (from 0 to 22), N for a subregion at zoom level 7 is about 50, for zoom level 8 is about 100 and for zoom level 10 is about 90.

Figure 3:
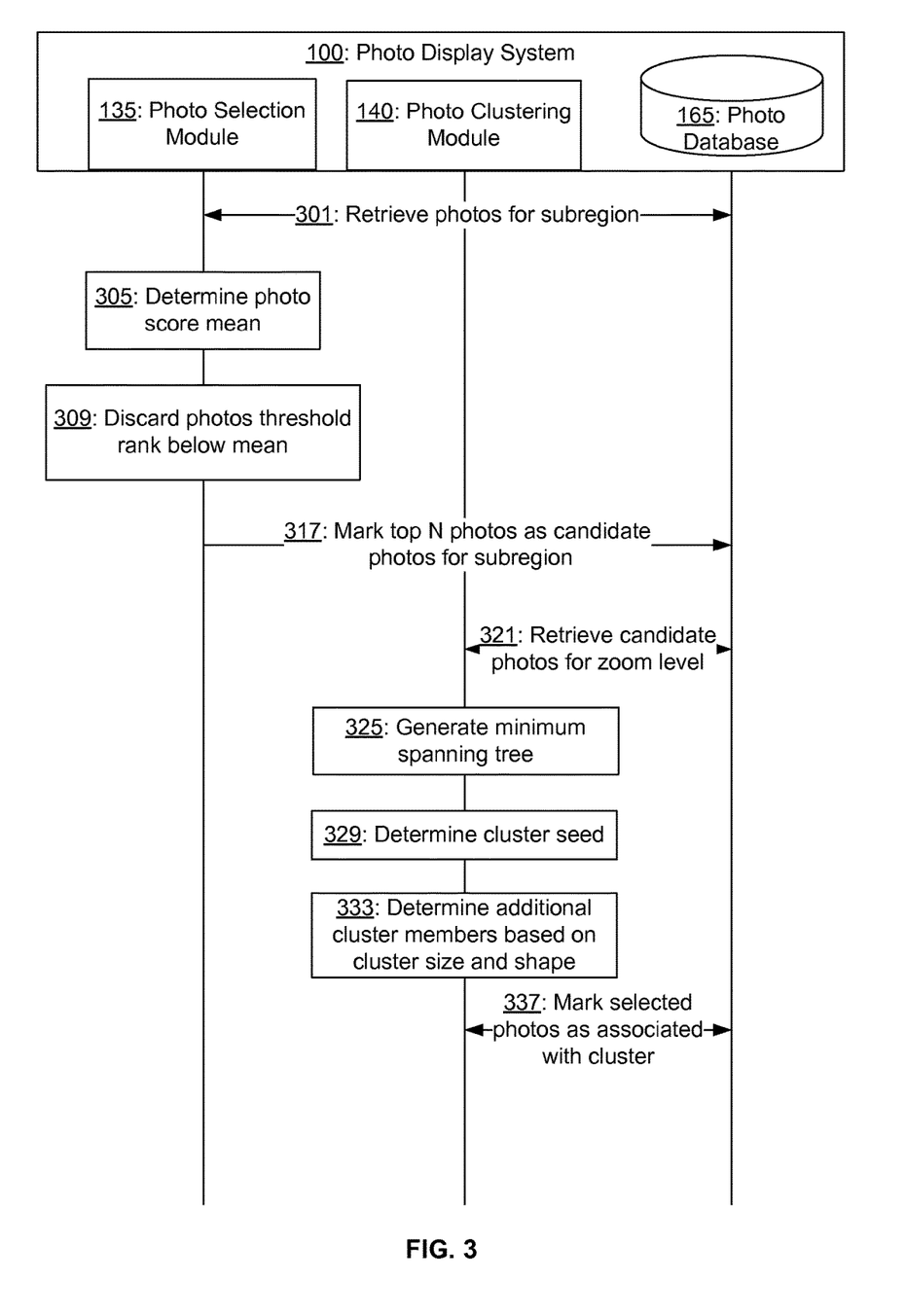
FIG. 3 is a data flow chart showing a method of selecting candidate photos and determining clusters of candidate photos for display according to one embodiment.

FIG. 3 illustrates how the photo selection module 135 selects the N photos that will be candidate photos for inclusion in clusters from each subregion. The photo selection module 135 retrieves 301 photos located in a first subregion in zoom level 0. The retrieved photos are all photos whose location (e.g., latitude and longitude) fall inside the geographical boundaries of the subregion. In one embodiment, the photo selection module 135 optionally only retrieves those photos within the subregion whose score exceeds a threshold. This step beneficially identifies the photos that have some extrinsic measure of quality or interest.

A combined score of the retrieved photos' scores is determined. In one embodiment, the combined score is the mean value of the retrieved photos' scores is determined 305. Alternatively, the median or mode of the scores, or some other figure of merit derived from the photo scores, could be determined. Any photo whose score is lower than a threshold amount (or percentage) below the mean (or figure of merit) is discarded 309. This is because it is desirable to not have a large range of quality of photos displayed together. Of course, exceptionally high scoring photos should be displayed and thus those are not removed. For example, if photo scores have a scale of 0 to 1 and the mean photo score is 0.75 for the photos in a subregion, all photos with a score less than 0.5 could be discarded. Any threshold can be selected. Finally, the remaining photos are ranked by score and the top N photos are marked 317 as candidate photos for that subregion. If the remaining photos number fewer than N, all remaining photos are marked as candidate photos for that subregion. The process is repeated for the remaining subregions at zoom level 0 resulting in all candidate photos for clustering for display for zoom level 0.

Figure 4:
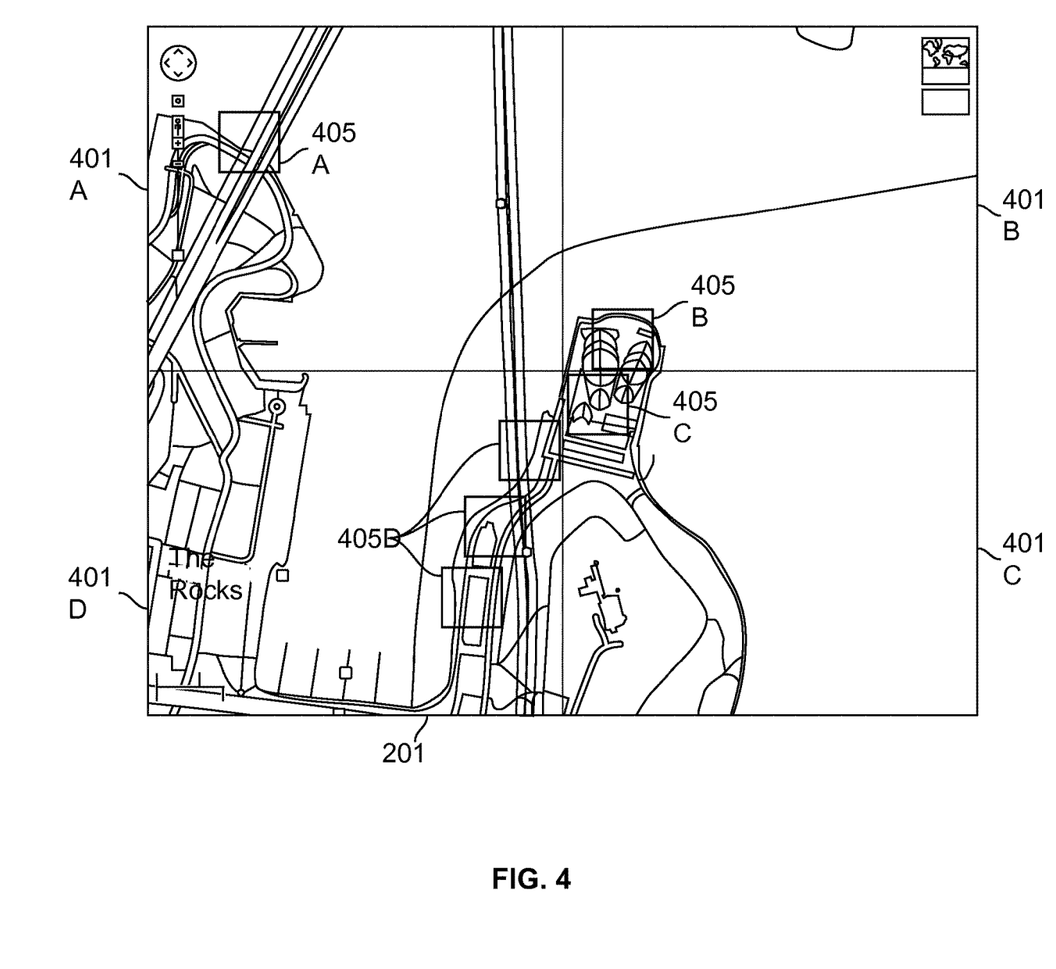
FIG. 4 is a screenshot illustrating candidate photos in a subregion at a first zoom level and a second zoom level.

The process for selecting candidate photos is repeated for each zoom level. Any photo that was a candidate photo at the prior zoom level x is included as a candidate photo for the next zoom x+1 level down. For example, the candidate photos for zoom level 0 are all candidate photos for zoom level 1. FIG. 4 illustrates this concept using example subregion 201 at zoom level x. Dividing subregion 201 into the four subregions 401A-D which make up subregion 201 when the map is zoomed in one level to x+1. Subregion 201 has six candidate photos 405A, 405B, 405C and three 405D. When selecting candidate photos for zoom level x+1, 405A is included as a candidate photo for subregion 401A, 405B is included as a candidate photo for subregion 401B, 405C is included as a candidate photo for subregion 401C and the three 405D are included as a candidate photo for subregion 401D. When candidate photos are selected for subregion 401A, 405A will be included and N−1 additional photos will be selected to add using steps 301-317 of FIG. 3.

In some embodiments, for the most zoomed in level, there is no selection of candidate photos and all photos in the database are candidate photos for clustering.

Once candidate photos have been determined for a particular zoom level, the candidate photos are clustered. The clustering of photos at one zoom level is not dependent on the clustering at another level and thus the clustering for multiple zoon levels can happen in parallel.

Referring again to FIG. 3, photo clustering module 140 accesses 321 the candidate photos for a particular zoom level. Clusters are determined using all candidate photos for the entire on-line map at that zoom level. This is useful because a single cluster may cross the divide between subregions. The photo clustering module 140 generates 325 a minimum spanning tree of all of the photos spatially arranged according to their location on the online map. Each candidate photo is a node in the tree and the edges are the distances between them on the map. Minimum spanning trees are known in the art and can be generated using a variety of algorithms including, but not limited to, Borůvka's algorithm, Prim's algorithm, Kruskal's algorithm and the reverse-delete algorithm. For example, for display on an application like Google Earth which displays map features as they appear on the surface of the earth, the distance between the photos is the geodetic distance. On traditional on-line map systems, the distance would be the distance of the photo locations in a coordinate projection, also referred to as map distance.

All of the edges of the minimum spanning tree are ranked from shortest to longest distance and the two photos that are the endpoints of the shortest edge are the seed 329 for the first cluster and placed in a table. For each cluster, there is a predetermined size and shape. The predetermined size is characterized by a maximum distance from the seed of the cluster to any photo in the cluster and a maximum distance from any one photo to any other photo in the cluster. The cluster's shape is determined by a measure of the distribution of photos in the cluster. In one embodiment the shape of a cluster is determined using Principal Component Analysis (PCA) and a ratio of the minimum and maximum eigenvalues of the cluster ($\lambda_{min}/\lambda_{max}$) is used to represent the shape of each cluster. The closer the ratio is to 1, the more round the cluster will be, and the closer to 0 the ratio gets, the more elliptical the cluster will be. A target ratio can be specified; in some embodiments the target ratio is a range such as 0.74-0.76, for example. In some embodiments, the shape of the cluster is set to mirror the shape of the map feature in the photos. For example, the target ratio (shape) for a cluster of photos of a bridge would be more elliptical while the target ratio for a cluster of photos for a stadium would be more circular. In some embodiments the minimum ratio is 0.5.

Photos in the minimum spanning tree are assessed one at a time for inclusion in a cluster. The first photo to be considered for adding to the cluster after the two seed photos is the photo that is closest to either of the two seed photos. This photo need not be connected to either of the two seed photos in the minimum spanning tree. The distance is assessed to each of the two seed photos, S1 and S2. There will be a photo, P1, that is closest to S1 having a distance between them of S1-P1 and a photo, P2, that is closest to S2 having a distance between them of S2-P2. The photo that has the shortest distance S1-P1 or S2-P2, is the next photo to be considered for inclusion in the cluster. Various data structures can be used to efficiently determine the closest photo. These include kd trees, quad trees and combinations thereof. The size and shape of the cluster with the potential additional photo added is assessed as part of the determination of whether to add the photo. Provided that the size and shape of the cluster with the photo would still meet the predetermined size and shape, the photo is added to the cluster. If adding the photo would result in a cluster not meeting the predetermined size and shape for that cluster, the photo is not added to the cluster. This procedure is repeated until no more photos can be added while still maintaining the cluster's predetermined size and shape. At that point the cluster is complete. The photos in the cluster are removed from the minimum spanning tree and any edges from those photos to photos remaining in the minimum spanning tree are removed from the ranked table of edges. In some embodiments, the scores of the photos in the cluster are analyzed as they were in steps 305 and 309 but only for the photos in the cluster. A mean (or other figure of merit) of the photo scores is determined and any photo whose score is lower than a threshold amount below the mean is removed from the cluster.

To obtain the next cluster, the shortest edge remaining in the minimum spanning tree is used as the seed for the next cluster. These processes are repeated until no more clusters can be formed because no two candidate photos meet the criteria for forming a cluster. In some embodiments, all of the candidate photos are used up in clusters.

Figure 5:
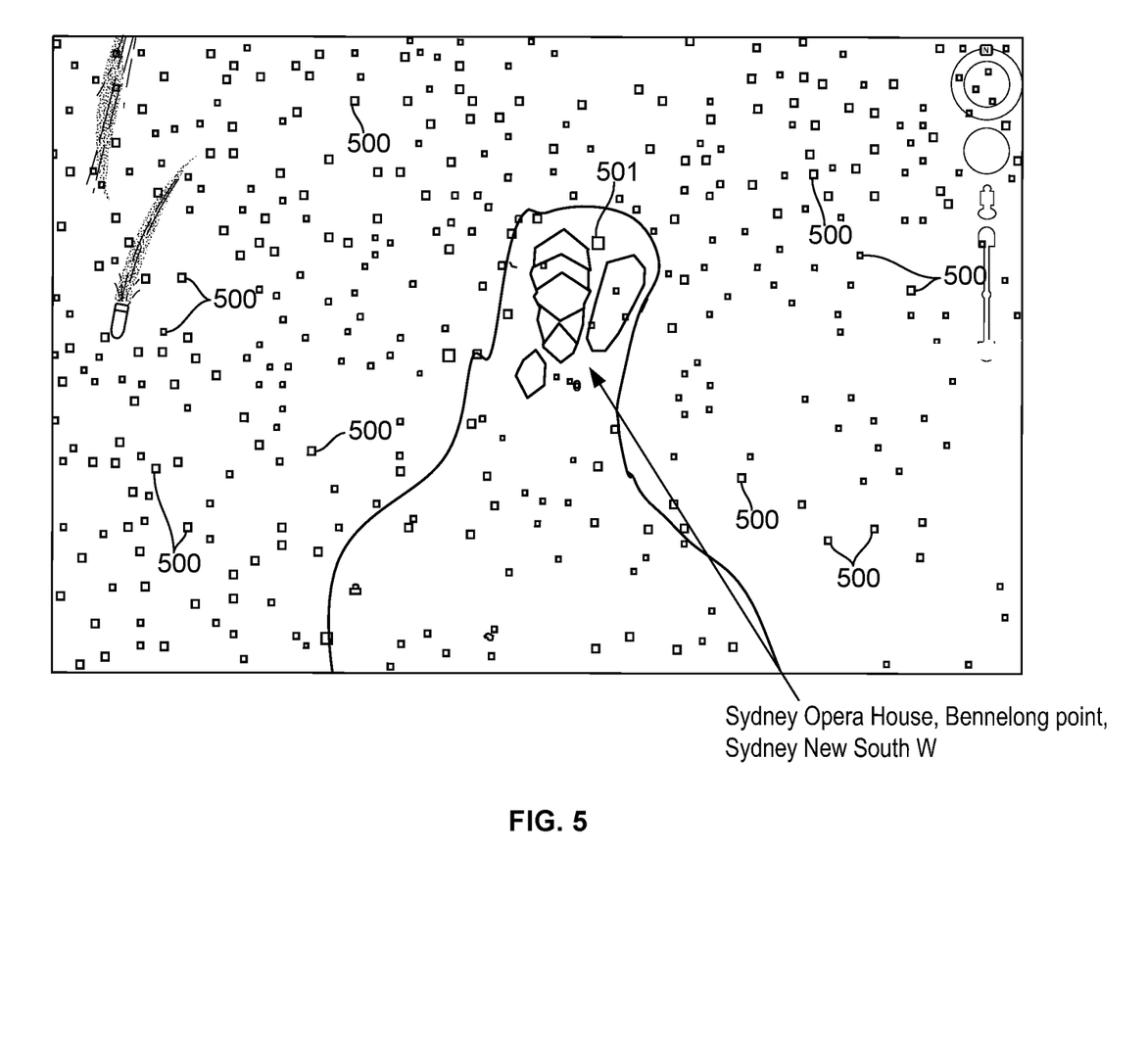
FIG. 5 is a screenshot illustrating clustered photos displayed on an on-line map.

As the clusters are completed, the photos are marked as being associated with their respective clusters. Then when users request an online map of a particular region and photos displayed upon them, the clusters corresponding to the requested zoom level and region are displayed to the user via the application 160 at client 155 on the online map. FIG. 5 illustrates photos displayed on a Google Earth view of the Sydney Opera House. Each icon 500 represents a cluster of photos. Those of the Sydney Opera House are associated with that map feature. When a user clicks on the icon, a first photo in the cluster is displayed to the user and the user can scroll through the remaining photos in the cluster. In some embodiments, the highest ranking photo is shown first. In other embodiments, the first photo is selected randomly. This way many more photos can be available to users but the underlying map feature, the Sydney Opera House, is not obscured from view. One of the icons, 501, represents a cluster of 89 photos. If all of those photos were actually placed on the satellite image at their respective locations, a much larger portion of the Sydney Opera House would be obscured from view.

As additional photos are added to the photo database 165, the photo display system 100 updates the clustering starting with selection of candidate photos for each zoom level by the photo selection module 135 and then creating clusters from the candidate photos by the photo clustering module 140. Clusters can be updated daily, weekly or as necessary based on the volume of new photos added. In some embodiments, new photos added by users are automatically added to the cluster corresponding to the location of the photo without first reselecting candidate photos and recreating clusters. When clusters are regenerated less frequently, adding new photos to existing clusters has the benefit of displaying the newest photos immediately.

The present disclosure has been described in particular detail with respect to several possible embodiments. Those of skill in the art will appreciate that the disclosure may be practiced in other embodiments. First, the particular naming of the modules, capitalization of terms, the attributes, data structures, or any other programming or structural aspect is not mandatory or significant, and the mechanisms that implement the disclosure or its features may have different names, formats, or protocols. Further, the system and the individual modules may be implemented as either software code executed by the computer system, or as hardware elements with dedicated circuit logic, or a combination of hardware and software. Also, the particular division of functionality between the various system components described herein is merely exemplary, and not mandatory; functions performed by a single system module may instead be performed by multiple modules, and functions performed by multiple modules may instead performed by a single module.

Some portions of above description present the features of the present disclosure in terms of methods and symbolic representations of operations on information. These descriptions and representations are the means used by those skilled in the data processing arts to most effectively convey the substance of their work to others skilled in the art. These operations, while described functionally or logically, are understood to be implemented by computer programs. Furthermore, it has also proven convenient at times, to refer to these arrangements of operations as modules or by functional names, without loss of generality.

Unless specifically stated otherwise as apparent from the above discussion, it is appreciated that throughout the description, discussions utilizing terms such as "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain aspects of the present disclosure include process steps and instructions described herein in the form of a method. It should be noted that the process steps and instructions of the present disclosure could be embodied in software, firmware or hardware, and when embodied in software, could be downloaded to reside on and be operated from different platforms used by real time network operating systems.

The present disclosure also relates to an apparatus for performing the operations herein. This apparatus may be specially constructed for the required purposes, or it may comprise a general-purpose computer selectively activated or reconfigured by a computer program stored on a computer readable medium that can be accessed by the computer. Such a computer program may be stored in a tangible non-transitory computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The methods and operations presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will be apparent to those of skill in the, along with equivalent variations. In addition, the present disclosure is not described with reference to any particular programming language. It is appreciated that a variety of programming languages may be used to implement the teachings of the present disclosure as described herein, and any references to specific languages are provided for disclosure of enablement and best mode of the present disclosure.

The present disclosure is well suited to a wide variety of computer network systems over numerous topologies. Within this field, the configuration and management of large networks comprise storage devices and computers that are communicatively coupled to dissimilar computers and storage devices over a network, such as the Internet, public networks, private networks, or other networks enabling communication between computing systems. Finally, it should be noted that the language used in the specification has been principally selected for readability and instructional purposes, and may not have been selected to delineate or circumscribe the inventive subject matter. Accordingly, the disclosure of the present disclosure is intended to be illustrative, but not limiting, of the scope of the disclosure, which is set forth in the following claims.

The invention claimed is:

1. A computer-implemented method of organizing photographs for display on an on-line map, the method comprising:
   accessing a plurality of photographs, each photograph associated with a map feature on the on-line map and a score indicating the photograph's suitability;
   selecting, by one or more computers, a set of candidate photographs from among the plurality of photographs, responsive to the photographs' scores;
   determining, by the one or more computers, a cluster of selected photographs from the set of candidate photographs, the cluster having a predetermined shape determined by a measure of distribution of the selected photographs in the cluster and a threshold size determined based on geographic distance among locations associated with the set of candidate photographs, the selected photographs being selected such that a resulting shape and a resulting size of the cluster with the selected photographs are within the predetermined shape and the threshold size of the cluster, respectively; wherein the cluster corresponds to a particular zoom level for the on-line map, wherein clustering of the selected photographs at one zoom level is not dependent on clustering at another zoom level; and wherein the predetermined shape is further determined based on a shape of the map feature; and storing the cluster as associated with each of the selected photographs in the set.

2. The method of claim 1, wherein each photograph is associated with a location and the method further comprises:

receiving a request from a client device for an on-line map;

identifying a cluster from among a plurality of clusters, the identified cluster having at least one photograph whose location is on the requested on-line map; and providing the requested on-line map and the identified cluster for display at the client wherein the identified cluster is configured for display on the on-line map as an icon associated with the map feature of the cluster.

3. The method of claim 1, wherein determining the cluster from the set of candidate photographs comprises:

representing the set of candidate photographs as a minimum spanning tree having a plurality of nodes connected by a plurality of edges, each photograph associated with a node in the minimum spanning tree and each edge representing a geographic distance between locations of the photographs associated with the nodes connected to the edge;

ranking the plurality of edges by the geographic distances represented by the edges;

selecting photographs connected by an edge having a shortest distance as a seed for the cluster;

determining a first additional photograph associated with a node having an edge with a shortest distance to the seed; and responsive to the cluster with the first additional photograph not exceeding the threshold size and having the predetermined shape, adding the first additional photograph to the cluster.

4. The method of claim 3, wherein whether adding the first additional photograph exceeds the threshold size comprises:

determining a first geographic distance of the first additional photograph to a center of the cluster and comparing the first geographic distance to a first threshold geographic distance;

determining second geographic distances of the first additional photograph to each other photo in the cluster;

ranking the second geographic distances and comparing a longest second geographic distance to a second threshold geographic distance; and responsive to the first geographic distance not exceeding the first threshold geographic distance and the longest second geographic distance not exceeding the second threshold geographic distance, determining that adding the first additional photograph does not exceed the threshold size.

5. The method of claim 1 wherein the on-line map comprises a plurality of subregions and wherein selecting a set of candidate photographs comprises selecting a subset of candidate photographs for each of the subregions and includes:

accessing, from the plurality of photographs, photographs having locations in the subregion;

selecting from the photographs having locations in the subregion, photographs whose score exceeds a first threshold score;

determining a combined score for the photographs whose score exceeds the first threshold score;

determining a second threshold score based on the combined score;

selecting, from photographs whose score exceeds the first threshold score, the photographs having a score higher than the second threshold score as the subset of candidate photos for the subregion; and combining the subsets of candidate photographs for each of the subregions into the set of candidate photographs.

6. The method of claim 5 wherein the combined score is a mean score and the second threshold score is a predefined amount below the mean score.

7. The method of claim 5, wherein the on-line map comprises a hierarchy of levels, the levels including a highest level and a lowest level, each level having a set of candidate photographs and the set of candidate photographs are associated with the highest level, the method further comprising selecting a second set of candidate photographs associated for a next to highest level, and the second set of candidate photographs includes all photographs in the set of candidate photographs.

8. The method of claim 1, wherein the cluster maintains a spatial distribution and density of photographs of the set.

9. The method of claim 1, wherein the measure of distribution is determined in accordance with a target ratio range.

10. The method of claim 1, wherein the predetermined shape is determined by the measure of distribution according to a ratio of minimum and maximum eigenvalues of the cluster of selected photographs.

11. A computer system for organizing photographs for display on an on-line map, comprising:

a processor for executing computer program code; and a non-transitory computer-readable storage medium storing executable program code for performing a method of:

accessing a plurality of photographs, each photograph associated with a map feature on the on-line map and a score indicating the photograph's suitability;

selecting a set of candidate photographs, from among the plurality of photographs, responsive to the photographs' scores;

determining a cluster of selected photographs from the set of candidate photographs, the cluster having a predetermined shape determined by a measure of distribution of the selected photographs in the cluster and a threshold size determined based on geographic distance among locations associated with the set of candidate photographs, the selected photographs being selected such that a resulting shape and a resulting size of the cluster with the selected photographs are within the predetermined shape and the threshold size of the cluster, respectively; wherein the cluster corresponds to a particular zoom level for the on-line map, wherein clustering of the selected photographs at one zoom level is not dependent on clustering at another zoom level; and wherein the predetermined shape is further determined based on a shape of the map feature; and storing the cluster as associated with each of the selected photographs in the set.

12. The computer system of claim 11, wherein each photograph is associated with a location and further comprising executable program code for:

receiving a request from a client device for an on-line map;

identifying a cluster from among a plurality of clusters, the identified cluster having at least one photograph whose location is on the requested on-line map; and providing the requested on-line map and the identified cluster for display at the client wherein the identified cluster is configured for display on the on-line map as an icon associated with the map feature of the cluster.

13. The computer system of claim 11, wherein determining the cluster from the set of candidate photographs comprises:
 representing the set of candidate photographs as a minimum spanning tree having a plurality of nodes connected by a plurality of edges, each photograph associated with a node in the minimum spanning tree and each edge representing a geographic distance between locations of the photographs associated with the nodes connected to the edge;
 ranking the plurality of edges by the geographic distances represented by the edges;
 selecting photographs connected by an edge having a shortest distance as a seed for the cluster;
 determining a first additional photograph associated with a node having an edge with a shortest distance to the seed; and
 responsive to the cluster with the first additional photograph not exceeding the threshold size and having the predetermined shape, adding the first additional photograph to the cluster.

14. The computer system of claim 13, wherein program code for determining whether adding the first additional photograph exceeds the threshold size comprises:
 determining a first geographic distance of the first additional photograph to a center of the cluster and comparing the first geographic distance to a first threshold geographic distance;
 determining second geographic distances of the first additional photograph to each other photo in the cluster;
 ranking the second geographic distances and comparing a longest second geographic distance to a second threshold geographic distance; and
 responsive to the first geographic distance not exceeding the first threshold geographic distance and the longest second geographic distance not exceeding the second threshold geographic distance, determining that adding the first additional photograph does not exceed the threshold size.

15. The computer system of claim 11, wherein the on-line map comprises a plurality of subregions and wherein selecting a set of candidate photographs comprises selecting a subset of candidate photographs for each of the subregions and the computer system further includes executable program code for:
 accessing, from the plurality of photographs, photographs having locations in the subregion;
 selecting from the photographs having locations in the subregion, photographs whose score exceeds a first threshold score;
 determining a combined score for the photographs whose score exceeds the first threshold score;
 determining a second threshold score based on the combined score;
 selecting, from photographs whose score exceeds the first threshold score the photographs having a score higher than the second threshold score as the subset of candidate photos for the subregion; and
 combining the subsets of candidate photographs for each of the subregions into the set of candidate photographs.

16. The computer system of claim 15, wherein the combined score is a mean score and the second threshold score is a predefined amount below the mean score.

17. The computer system of claim 15, wherein the on-line map comprises a hierarchy of levels, the levels including a highest level and a lowest level, each level having a set of candidate photographs and the set of candidate photographs are associated with the highest level, the computer system further comprising program code for selecting a second set of candidate photographs associated for a next to highest level, and the second set of candidate photographs includes all photographs in the set of candidate photographs.

18. A non-transitory computer-readable storage medium storing executable program code for photographs for display on an on-line map, the executable program code comprising program code for:
 accessing a plurality of photographs, each photograph associated with a map feature on the on-line map and a score indicating the photograph's suitability;
 selecting a set of candidate photographs, from among the plurality of photographs, responsive to the photographs' scores;
 determining a cluster of selected photographs from the set of candidate photographs, the cluster having a predetermined shape determined by a measure of distribution of the selected photographs in the cluster and a threshold size determined based on geographic distance among locations associated with the set of candidate photographs, the selected photographs being selected such that a resulting shape and a resulting size of the cluster with the selected photographs are within the predetermined shape and the threshold size of the cluster, respectively; wherein the cluster corresponds to a particular zoom level for the on-line map, and wherein clustering of the selected photographs at one zoom level is not dependent on clustering at another zoom level; and wherein the predetermined shape is further determined based on a shape of the map feature; and
 storing the cluster as associated with each of the selected photographs in the set.

19. The non-transitory computer-readable storage medium of claim 18, wherein each photograph is associated with a location and the executable program code further comprises program code for:
 receiving a request from a client device for an on-line map;
 identifying a cluster from among a plurality of clusters, the identified cluster having at least one photograph whose location is on the requested on-line map; and
 providing the requested on-line map and the identified cluster for display at the client wherein the identified cluster is configured for display on the on-line map as an icon associated with the map feature of the cluster.

20. The non-transitory computer-readable storage medium of claim 18, wherein determining the cluster from the set of candidate photographs comprises:
 representing the set of candidate photographs as a minimum spanning tree having a plurality of nodes connected by a plurality of edges, each photograph associated with a node in the minimum spanning tree and each edge representing a geographic distance between locations of the photographs associated with the nodes connected to the edge;
 ranking the plurality of edges by the geographic distances represented by the edges;
 selecting photographs connected by an edge having a shortest distance as a seed for the cluster;
 determining a first additional photograph associated with a node having an edge with a shortest distance to the seed; and responsive to the cluster with the first additional photograph not exceeding the threshold size and having the predetermined shape, adding the first additional photograph to the cluster.

21. The non-transitory computer-readable storage medium of claim 20, wherein whether adding the first additional photograph exceeds the threshold size comprises:
determining a first geographic distance of the first additional photograph to a center of the cluster and comparing the first geographic distance to a first threshold geographic distance;
determining second geographic distances of the first additional photograph to each other photo in the cluster;
ranking the second geographic distances and comparing a longest second geographic distance to a second threshold geographic distance; and
responsive to the first geographic distance not exceeding the first threshold geographic distance and the longest second geographic distance not exceeding the second threshold geographic distance, determining that adding the first additional photograph does not exceed the threshold size.

22. The non-transitory computer-readable storage medium of claim 21, wherein the on-line map comprises a plurality of subregions and wherein selecting a set of candidate photographs comprises selecting a subset of candidate photographs for each of the subregions, the storage medium further comprising program code for:
accessing, from the plurality of photographs, photographs having locations in the subregion;
selecting from the photographs whose location is in the subregion, photographs whose score exceeds a first threshold score;
determining a combined score for the photographs whose score exceeds the first threshold score;
determining a second threshold score based on the combined score;
selecting from photographs whose score exceeds the first threshold score the photographs having a score higher than the second threshold score as the subset of candidate photos for the subregion; and
combining the subsets of candidate photographs for each of the subregions into the set of candidate photographs.

23. The non-transitory computer-readable storage medium of claim 21, wherein the on-line map comprises a hierarchy of levels, the levels including a highest level and a lowest level, each level having a set of candidate photographs and the set of candidate photographs are associated with the highest level, the storage medium further comprising program code for selecting a second set of candidate photographs associated for the next to highest level, and the second set of candidate photographs includes all photographs in the set of candidate photographs.

* * * * *